| | | |
|---|---|---|
| (12) | United States Patent<br>Shin | (10) Patent No.: US 11,525,923 B2<br>(45) Date of Patent: Dec. 13, 2022 |

(54) REAL-TIME THREE-DIMENSIONAL MAP BUILDING METHOD AND DEVICE USING THREE-DIMENSIONAL LIDAR

(71) Applicant: A.M.Autonomy Co., Ltd., Seoul (KR)

(72) Inventor: Yongdeuk Shin, Seoul (KR)

(73) Assignee: A.M.AUTONOMY CO., LTD., Seoul (KR)

( * ) Notice: Subject to any disclaimer, the term of this patent is extended or adjusted under 35 U.S.C. 154(b) by 655 days.

(21) Appl. No.: 16/565,943

(22) Filed: Sep. 10, 2019

(65) Prior Publication Data

US 2020/0088882 A1 Mar. 19, 2020

(30) Foreign Application Priority Data

Sep. 13, 2018 (KR) ........................ 10-2018-0109348

(51) Int. Cl.
*G01S 17/89* (2020.01)
*G06T 7/73* (2017.01)
(Continued)

(52) U.S. Cl.
CPC ............ *G01S 17/89* (2013.01); *G01S 7/4817* (2013.01); *G01S 17/894* (2020.01); *G06T 7/73* (2017.01);
(Continued)

(58) Field of Classification Search
CPC ...... G01S 17/89; G01S 17/894; G01S 7/4817; G01S 7/4804; G06T 7/73; G06T 19/00; G06T 15/00; G06T 2210/56
See application file for complete search history.

(56) References Cited

U.S. PATENT DOCUMENTS

| | | | | |
|---|---|---|---|---|
| 11,274,929 | B1 * | 3/2022 | Afrouzi ................ | G05D 1/0272 |
| 2003/0137646 | A1 * | 7/2003 | Hoffman ................ | G01S 17/89<br>356/612 |

(Continued)

FOREIGN PATENT DOCUMENTS

KR 10-1715780 B1 3/2017

OTHER PUBLICATIONS

Nüchter, Andreas. 3D robotic mapping: the simultaneous localization and mapping problem with six degrees of freedom. vol. 52. Springer, 2008. (Year: 2008).*

(Continued)

*Primary Examiner* — Yu Chen
(74) *Attorney, Agent, or Firm* — LRK Patent Law Firm

(57) ABSTRACT

Real-time three-dimensional (3D) map building method and device using a 3D lidar includes representing 3D map data of a surrounding environment acquired by using a 3D lidar attached to a moving object as voxels, acquiring an eigenvalue and an eigenvector for each voxel based on all 3D points in a 3D map represented as the voxels, detecting a 3D corresponding point in the voxel corresponding to all the 3D points of 3D data newly acquired by using the 3D lidar while the moving object travels, calculating a rotation transformation and a translation transformation for minimizing an error by minimizing an inner product value between the eigenvector weighted by the eigenvalue of the voxel to which the 3D corresponding point belongs and a vector generated from a 3D corresponding point, and updating the 3D map data based on the rotation transformation and the translation transformation.

6 Claims, 11 Drawing Sheets

(51) Int. Cl.
    *G01S 7/481*     (2006.01)
    *G01S 17/894*     (2020.01)
    *G06T 19/00*     (2011.01)
    *G01S 7/48*     (2006.01)
    *G06T 15/00*     (2011.01)

(52) U.S. Cl.
    CPC ............ *G06T 19/00* (2013.01); *G01S 7/4804* (2013.01); *G06T 15/00* (2013.01); *G06T 2210/56* (2013.01)

(56) References Cited

U.S. PATENT DOCUMENTS

| | | | | |
|---|---|---|---|---|
| 2007/0024611 A1* | 2/2007 | Ingram | ................... | G06F 30/00 345/419 |
| 2018/0075643 A1* | 3/2018 | Sequeira | .............. | G05D 1/0274 |
| 2019/0049566 A1* | 2/2019 | Adams | ................... | G01C 25/00 |
| 2019/0346271 A1* | 11/2019 | Zhang | ................... | G01C 21/20 |
| 2020/0217666 A1* | 7/2020 | Zhang | ................... | H04W 4/029 |

OTHER PUBLICATIONS

Bosse, Michael, and Robert Zlot. "Continuous 3D scan-matching with a spinning 2D laser." 2009 IEEE International Conference on Robotics and Automation. IEEE, 2009. (Year: 2009).*

Shin, Yong-Deuk, et al. "A study on reliability enhancement for laser and camera calibration." International Journal of Control, Automation and Systems 10.1 (2012): 109-116. (Year: 2012).*

P.J.Besl et al., "A Method for Registration of 3D Shape", IEEE Trans. On Pattern Analysis and Machine Intelligence, vol. 14, Issue 2, 1992.

M. Bosse et al., "Continuous 3D Scan-Matching with a Spinning 2D Laser", IEEE, Int. Conf. on Robotics and Automation, 2009.

* cited by examiner

FIG. 3
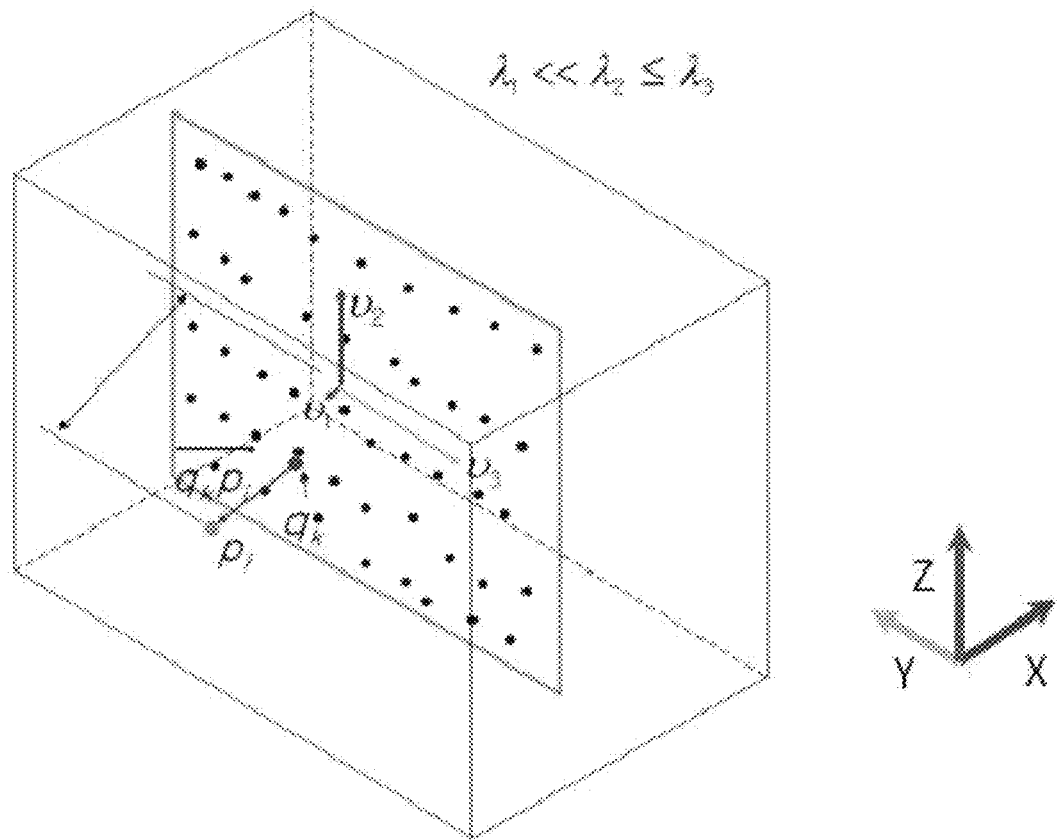
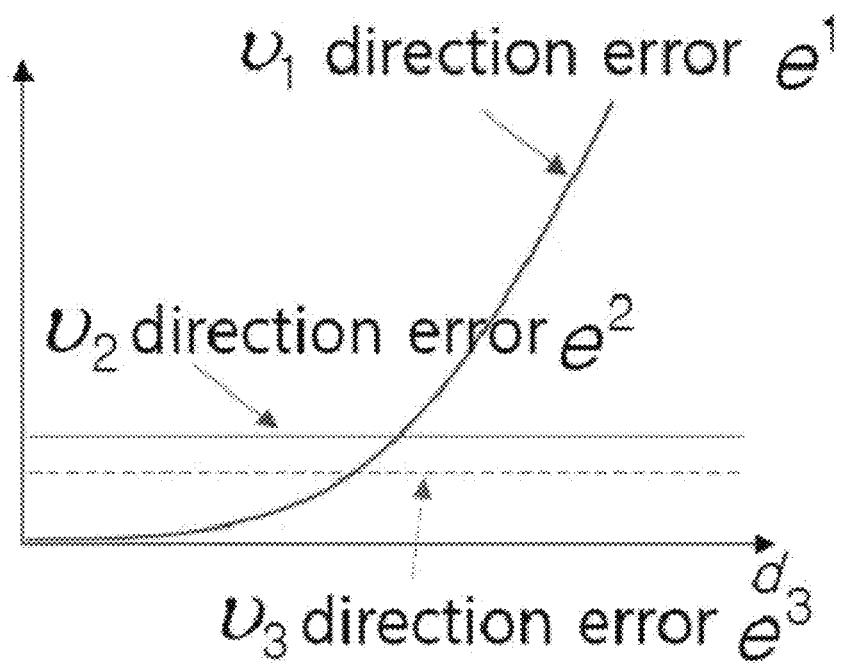

FIG. 4
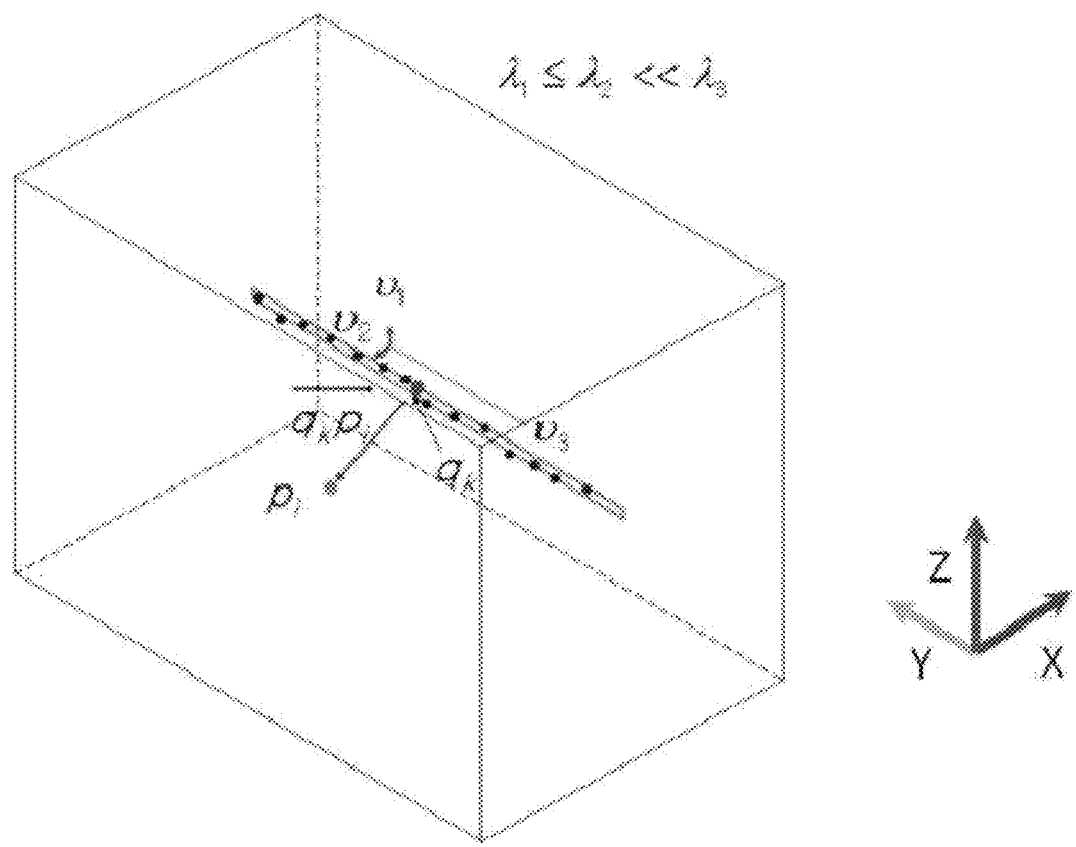
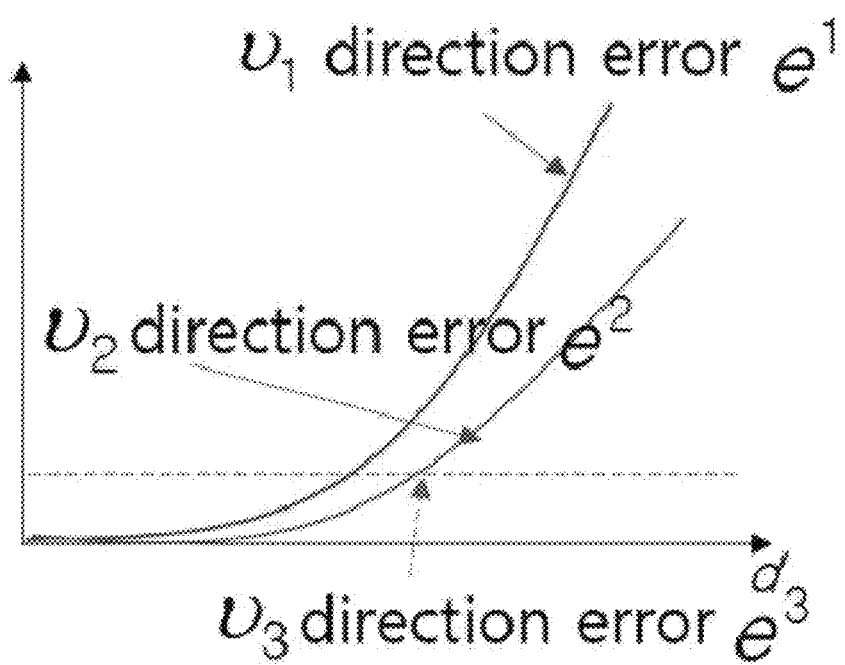

FIG. 5
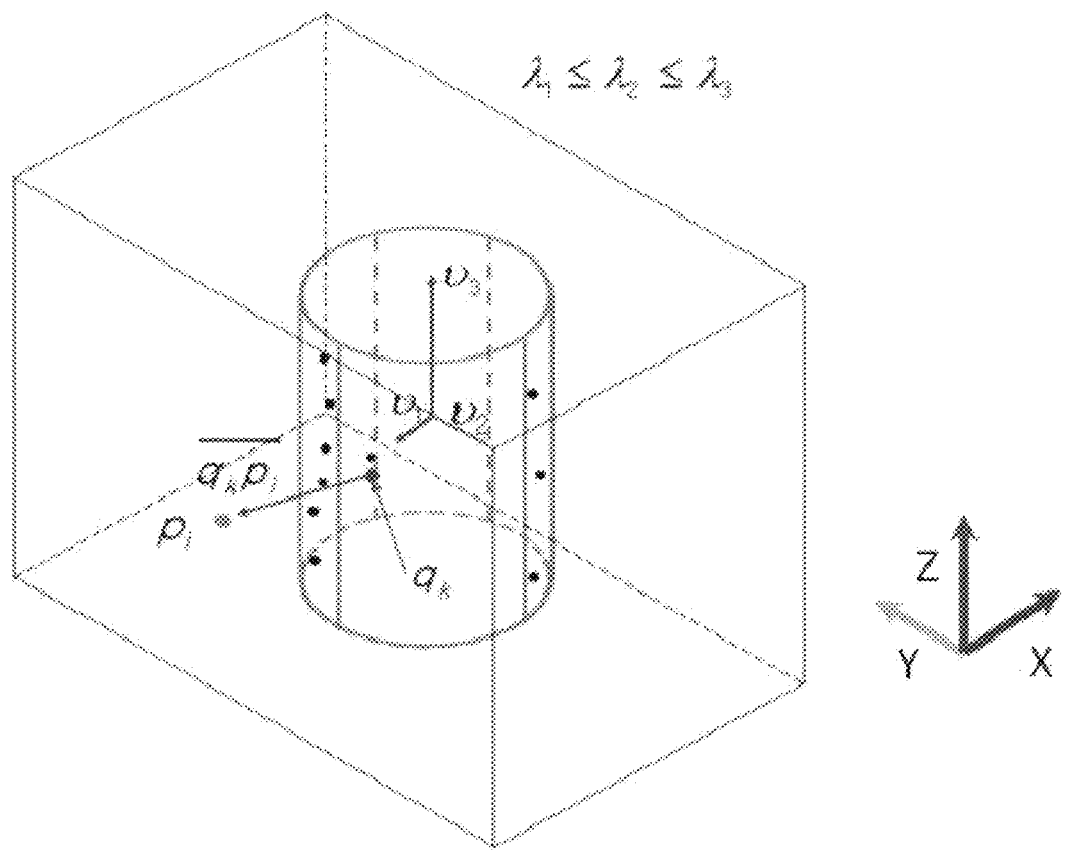
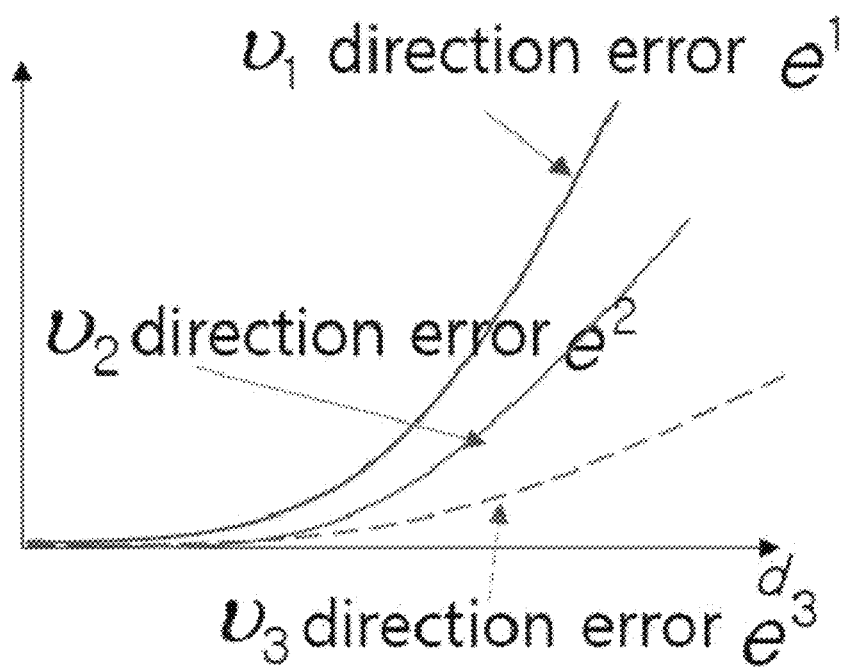

FIG. 7
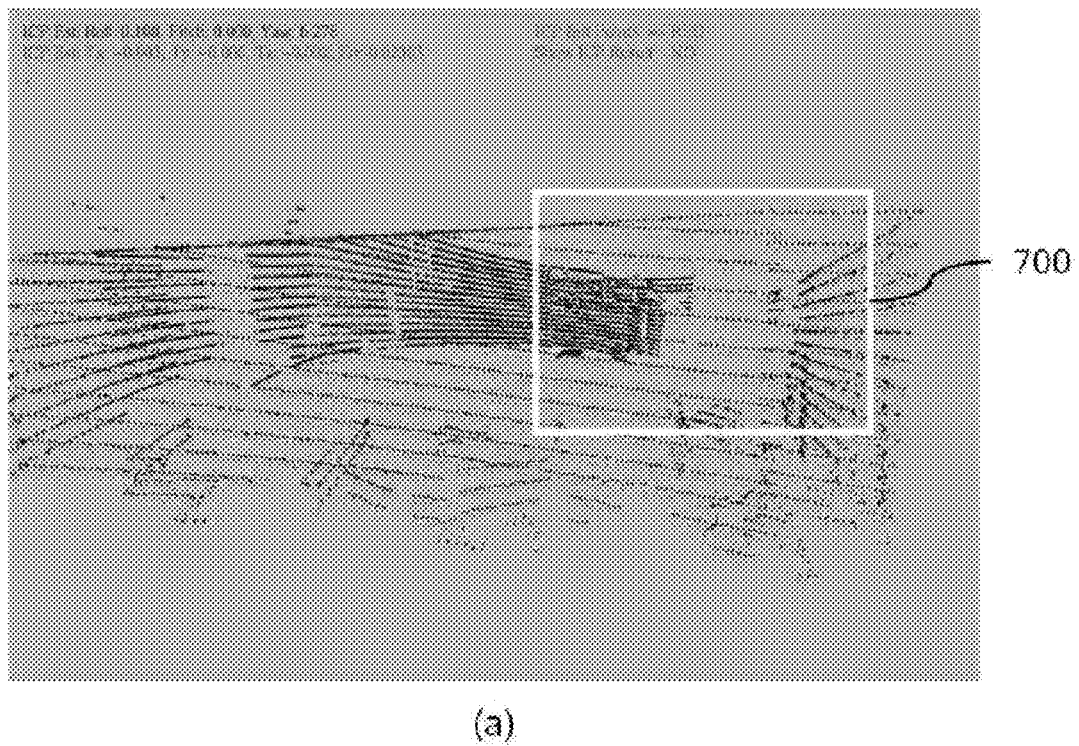
(a)
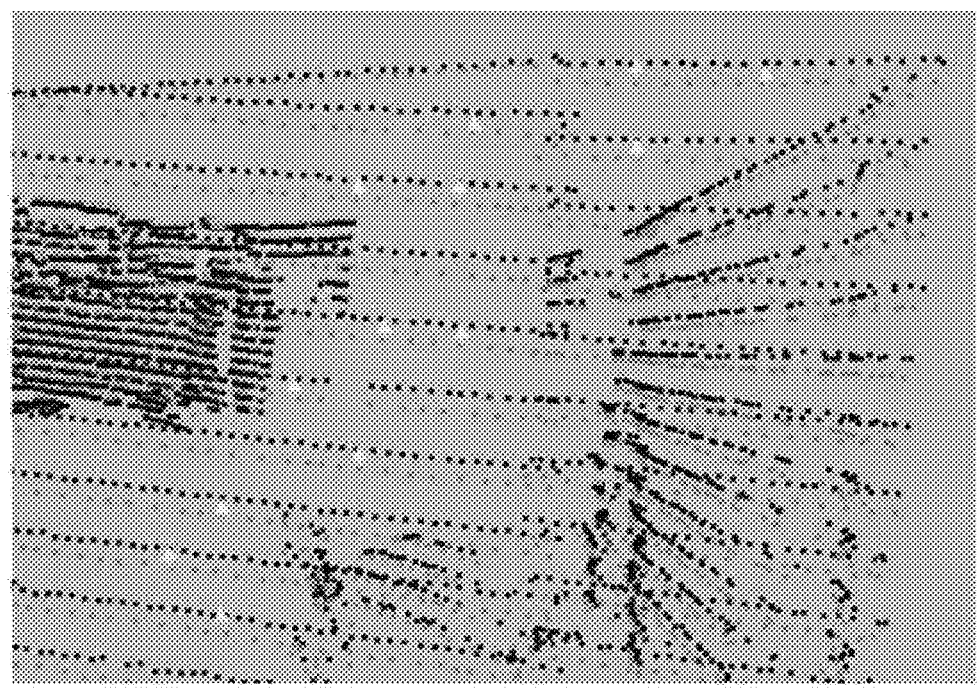
(b)

FIG. 10

```
Algorithm : 3D Mapping
input   : $\bar{m}_{t-1}$, $Z_t$, $T_{t-1}$
output  : newly updated $T_t$ and $\bar{m}_t$
begin
    generate $m_{t-1}$ from $\bar{m}_{t-1}$
    generate KD_Tree by using $m_{t-1}$ data
    for number of iterations(Iteration) do
        apply rigid body transformation $T_{t-1}$ for all data $p \in Z_t$
        for all rigid-body-transformed data $\tilde{p}$
            find corresponding three-dimensional point $q \in m_{t-1}$
        end
        in set C having relationship corresponding to each other
            $C = \{\{\tilde{p}_j, q_k\} | \tilde{p}_j \text{ end } q_k \text{ relationship corresponding to each other}\}$
        update $T_{t-1}$ of Equatin 2 by using Levenberg-Marqudart algorithm
        if convergence condition is satisfied then
            break
        end
    end
    update $\bar{m}_{t-1}$ and $\bar{M}_{t-1}$ by recalculating elements for all voxels $V_b$
    return $T_t \leftarrow T_{t-1}$, $\bar{m}_t \leftarrow \bar{m}_{t-1}$, $\bar{M}_t \leftarrow \bar{M}_{t-1}$
end
```

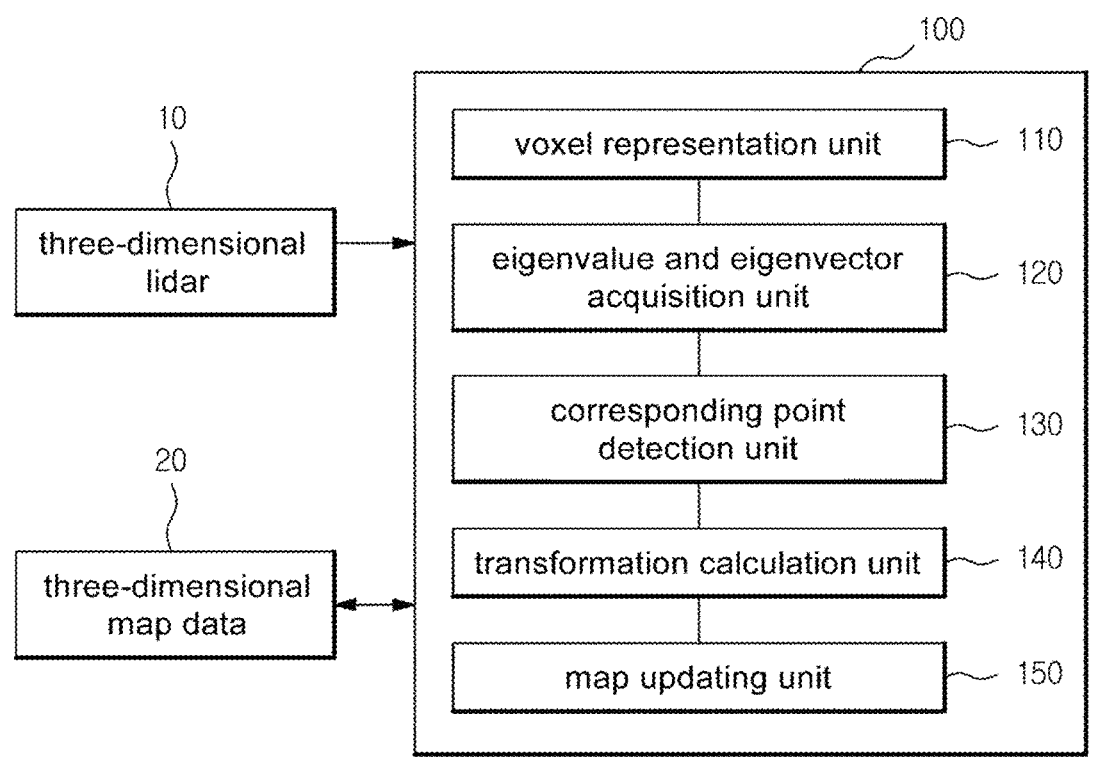

REAL-TIME THREE-DIMENSIONAL MAP BUILDING METHOD AND DEVICE USING THREE-DIMENSIONAL LIDAR

CROSS REFERENCE TO RELATED APPLICATION

This application claims priority to Korean Patent Application No. 10-2018-0109348, filed Sep. 13, 2018, the entire content of which is incorporated herein by reference.

BACKGROUND OF THE INVENTION

1. Field of the Invention

The present invention relates to real-time three-dimensional map building method and device using a three-dimensional lidar, and more particularly, to a method and a device of building a three-dimensional map in real time by using a three-dimensional lidar while moving.

2. Description of Related Art

Three-dimensional mapping enables a robot including an autonomous vehicle to perform a series of operations such as, generating a route by recognizing an environment, and planning an avoidance operation by detecting an obstacle. In the field of robots, the three-dimensional mapping is a technical field of a simultaneous location recognition and simultaneous localization and mapping (SLAM).

In the related art, in order to build a three-dimensional map for an environment by mounting a motor in a sensor such as a two-dimensional laser scanner, a method of acquiring three-dimensional data by using an iterative closest points (ICP) algorithm after stopping at a place were used (PJ Besl and NDMckay, A Method for Registration of 3D Shapes, IEEE Trans. On Pattern Analysis and Machine Intelligence, vol. 14, Issue 2, 1992). However, this method has a problem that it is impossible to build a map by attaching the three-dimensional lidar to a mobile robot due to a severe data distortion of movement, and it takes too much time to the three-dimensional mapping.

M. Bosse and R. Zlot, Continuous 3D Scan-Matching with a Spinning 2D Laser, IEEE, Int. Conf. on Robotics and Automation, 2009. Discloses an algorithm to solve the problem, but since many feature vectors that define two three-dimensional points are used, moset of algorithm execution time is consumed in finding a set of two corresponding points, and thus, there is a disadvantage in that real-time performance is not guaranteed.

SUMMARY OF THE INVENTION

An object of the present invention for solving the above problems is to provide a real-time three-dimensional map building method using a three-dimensional lidar capable of building a three-dimensional map in real time even during move.

Another object of the present invention for solving the above problems is to provide a real-time three-dimensional map building device using a three-dimensional lidar capable of building a three-dimensional map in real time even during move.

In order to achieve the objects, the present invention provides real-time three-dimensional map building method and device using a three-dimensional lidar which represent three-dimensional map data of a surrounding environment acquired by using a three-dimensional lidar attached to a moving object as voxels, acquire an eigenvalue and an eigenvector for each voxel based on all three-dimensional points in a three-dimensional map represented as the voxels, detect a three-dimensional corresponding point in the voxel corresponding to all the three-dimensional points of three-dimensional data newly acquired by using the three-dimensional lidar while the moving object travels, calculate a rotation transformation and a translation transformation for minimizing an error by minimizing an inner product value between the eigenvector weighted by the eigenvalue of the voxel to which the three-dimensional corresponding point belongs and a vector generated from a three-dimensional corresponding point, and update the three-dimensional map data based on the rotation transformation and the translation transformation.

Here, the rotation transformation and the translation transformation may be acquired by an equation below.

$$\left[\frac{1}{\lambda_1}v_1 \ \frac{1}{\lambda_2}v_2 \ \frac{1}{\lambda_3}v_3\right]^T [(Rp_i + t) - q_k] = \lceil e_i^1 e_i^2 e_i^3 \rceil^T$$

$$\lambda 1 > \lambda 2 > \lambda 3$$

In the above equation, $\lambda$ is the eigenvalue, $v$ is the eigenvector, R is the rotation transformation, t is the translation transformation, $e_i$ is an error in each eigenvector direction, $P_i$ is the three-dimensional point in the newly acquired three-dimensional data, and $q_k$ is the three-dimensional corresponding point in the voxel.

Here, the updating of the three-dimensional map data may include acquiring new eigenvalue and eigenvector if the three-dimensional point transformed based on the rotation transformation and the translation transformation is a new region, and updating the eigenvalue and eigenvector of the voxel if the three-dimensional point belongs to the voxel in the same space as the three-dimensional corresponding point.

Here, the calculating of the rotation transformation and the translation transformation may include determining that the error is minimum if differences between the rotation transformation and translation transformation which are updated and the rotation transformation and translation transformation which are calculated immediately before are less than a predetermined threshold.

The real-time three-dimensional map building method and device using a three-dimensional lidar according to the present invention have an advantage in that an accurate three-dimensional map may be created by estimating a translation and a rotation transformation in real time even if a three-dimensional lidar moves by using a unique continuous motion method according to the present invention, and thus, the present invention may be applied to a dynamic robot, a drone, an autonomous vehicle, and the like, and may also be applied both indoors and outdoors.

BRIEF DESCRIPTION OF THE DRAWINGS

FIG. 3 is a diagram illustrating a change in an expected value when the voxels to which an objective function of the embodiment of the present invention is applied are arranged in a plane.

FIG. 4 is a diagram illustrating a change in the expected value when the voxels to which the objective function of the embodiment of the present invention is applied are arranged in a straight line.

FIG. 5 is a diagram illustrating a change in the expected value when the voxels to which the object function of the embodiment of the present invention is applied are arranged in a cylinder.

FIG. 7 is a view illustrating disadvantages of the ICP objective function of the related art.

FIG. 10 is a pseudo code representing an algorithm for building the three-dimensional map according to the embodiment of the present invention.

FIG. 11 is a block diagram illustrating each configuration of the three-dimensional map building device according to the embodiment of the present invention.

DETAILED DESCRIPTION OF THE INVENTION

Figure 1:
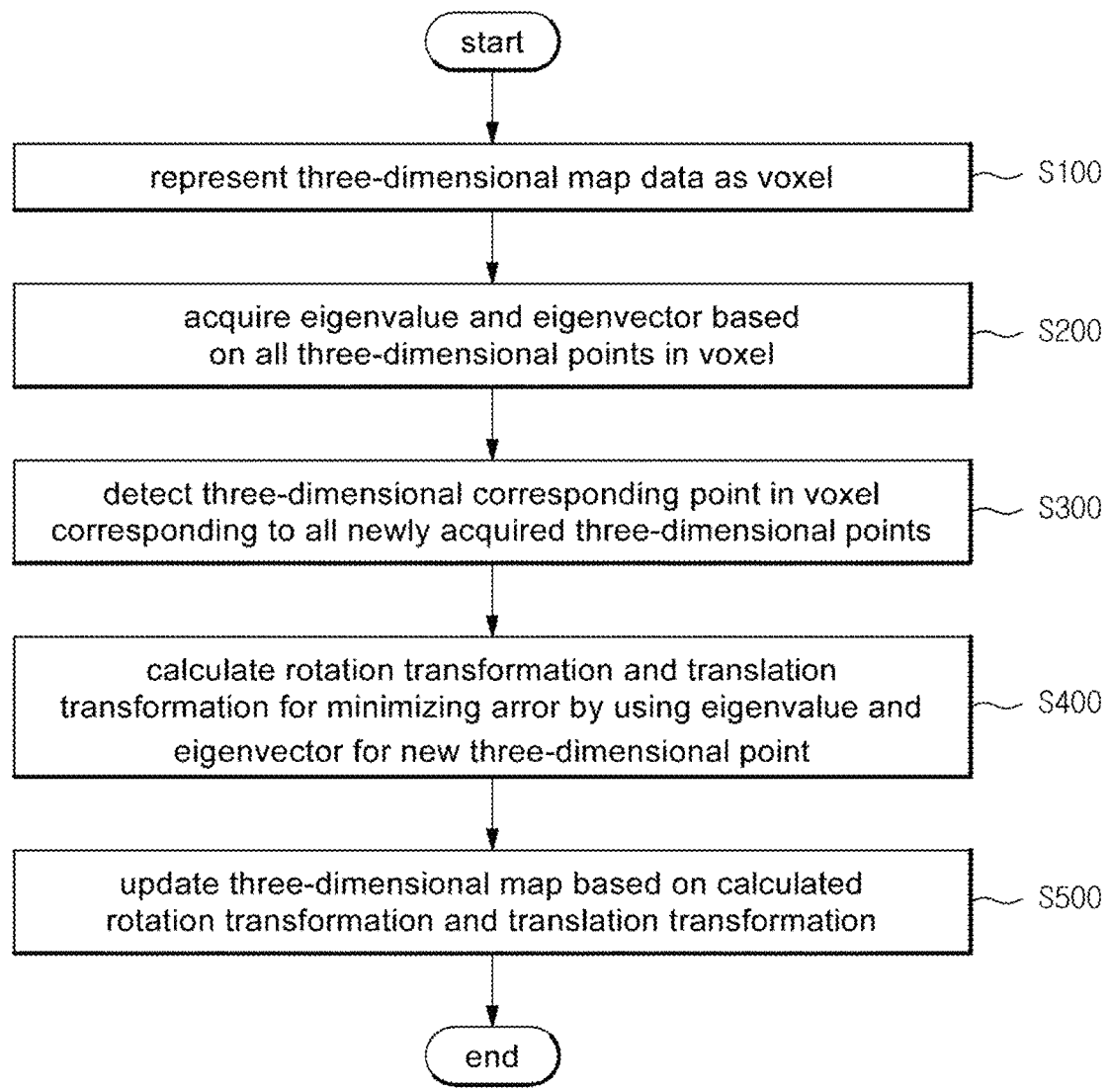
FIG. 1 is a flowchart illustrating a process of performing a method of building a three-dimensional map according to an embodiment of the present invention.

Since the present invention may be variously changed and have several embodiments, specific embodiments will be illustrated in the drawings and described in detail in the specification. However, this is not intended to limit the present invention to the specific embodiments, and it should be understood that the present invention includes all modifications, equivalents, and substitutes included in the spirit and scope of the present invention. In describing the drawings, similar reference numerals are used for similar configuration elements.

Terms such as first, second, A, and B may be used to describe various configuration elements, but the configuration elements should not be limited by the terms. The terms are used only for the purpose of distinguishing one configuration element from another configuration element. For example, without departing from the scope of the present invention, the first configuration element may be referred to as the second configuration element, and similarly, the second configuration element may also be referred to as the first configuration element. A term and/or includes a combination of a plurality of related items or any item of the plurality of related items.

When one configuration element is referred to as being "connected" or "coupled" to another configuration element, the one configuration element may be directly connected to or coupled to the other configuration element, it should be understood that still another configuration element may exist therebetween. Meanwhile, when one configuration element is referred to as being "directly connected" or "directly coupled" to another configuration element, it should be understood that there is no other configuration elements therebetween.

The terminology used in the present application is for the purpose of describing the specific embodiments only and is not intended to limit the present invention. A singular expression includes plural expressions unless the context clearly indicates otherwise. In the present application, it should be understood that the terms "include", "have", and the like are intended to designate existence of a feature, a number, a step, an operation, a configuration element, a component, or a combination thereof described in the specification, and a possibility of existence or addition of one or more other features, a number, a step, an operation, a configuration element, a component, or a combination thereof is not excluded in advance.

Unless defined otherwise, all terms which are used herein and include technical or scientific terms have the same meaning as commonly understood by those skilled in the art to which the present belongs. Terms such as terms defined in the commonly used dictionary should be construed as having meanings consistent with the meanings in the context of a related art and shall not be construed as ideal or excessively formal meanings unless expressly defined in the present application.

Three-dimensional mapping is becoming an important axis in the fourth Industrial Revolution together with accurate three-dimensional mapping for an autonomous vehicle, three-dimensional mapping for an autonomous flying drone, and a virtual reality (VR) service for indoor and outdoor spaces. Currently, the technology is largely divided into two types, and one of which is a mobile mapping system (MMS) that matches three-dimensional lidar (3D LiDAR) based on information on a position and a posture acquired through fusion of several sensors such as real-time kinematic (RTK), inertial measurement unit (IMU), and distance measurement indicator (DMI).

The other is a method for estimate the position and posture by using an algorithm such as scan matching with data acquired from the three-dimensional lidar and for using sensor data of the RTK and IMU as auxiliary data. One of advantages of the second method is that the three-dimensional mapping may be made even for an indoor space without a GPS signal. The present invention relates to a matching method based on a scan matching method of the three-dimensional lidar, which is a second method.

Meanwhile, a go-stop motion method is used for a traditional method of creating a map by using the three-dimensional lidar, and the method has a problem that, if the lidar moves during three-dimensional scan, the movement causes a distortion in measured data and an error to be large, and thereby, accuracy decreases, and thus, mapping takes a lot of time because the data is scanned while repeating a process of moving a sensor to a next position after acquiring a distance image in a stationary state.

In order to solve the problems, the present invention uses a unique continuous motion method, thereby, generating an accurate three-dimensional map by estimating a translation and a rotation transformation in real time even if the three-dimensional lidar moves. Therefore, the present invention may be applied to a dynamic robot, a drone, an autonomous vehicle, and the like.

Hereinafter, exemplary embodiments of the present invention will be described in detail with reference to the accompanying drawings.

FIG. 1 is a flowchart illustrating a process of performing a method of creating a three-dimensional map according to an embodiment of the present invention.

Referring to FIG. 1, the method of creating the three-dimensional map according to the embodiment of the present invention may include representing three-dimensional map data as voxels (S100), acquiring an eigenvalue and an eigenvector based on all three-dimensional points in the voxels (S200), detecting a three-dimensional corresponding point corresponding to a newly acquired three-dimensional point (S300), calculating a rotation transformation and a translation transformation (S400), and updating a map (S500).

Further, referring to FIG. 1, each step of the method of creating the three-dimensional map according to the embodiment of the present invention may be described as follows.

First, the three-dimensional map data of a surrounding environment acquired by using a three-dimensional lidar (for example, a Velodyne lidar) is represented as voxels (S100), and an eigenvalue λ and an eigenvector v are calculated based on all three-dimensional points in each voxel (S200).

Figure 2:
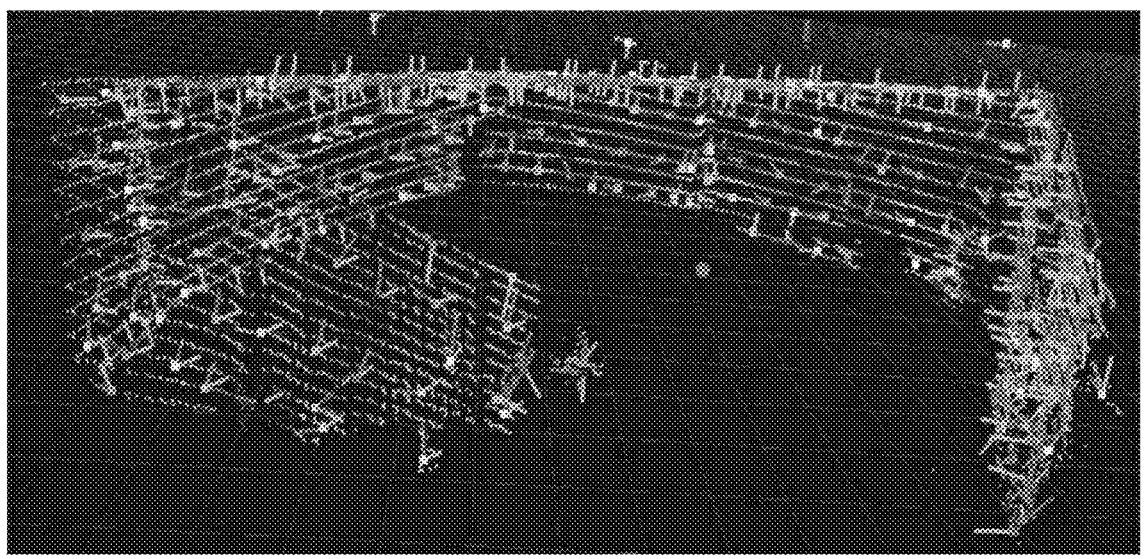
FIG. 2 is a view illustrating eigenvectors by representing three-dimensional map data in voxels.

FIG. 2 illustrates the eigenvector for each voxel represented from the three-dimensional map data. Elements included in one voxel are represented in the same color and represent the eigenvector at the center of the voxel.

Next, a three-dimensional corresponding point in the voxel corresponding to all three-dimensional points of the three-dimensional data acquired by newly scanning may be detected by using the three-dimensional lidar while a moving object (for example, an autonomous vehicle or a drone or the like) travels (S300). The Euclidean distance may be used for the corresponding point detection like an iterative closest points (ICP) algorithm, which is not limited to the present embodiment. Since the three-dimensional corresponding point detection is a known method, description thereof will be omitted.

At this time, an error calculated when there is a corresponding point $q_k$ after a point $p_i$ is transformed by a rotation transformation R and a translation transformation t is represented by Equation 1.

$$\left[\frac{1}{\lambda_1}v_1 \; \frac{1}{\lambda_2}v_2 \; \frac{1}{\lambda_3}v_3\right]^T [(Rp_i+t)-q_k] = [e_i^1 \; e_i^2 \; e_i^3]^T \quad \text{Equation 1}$$

Next, for all three-dimensional points $p_i$ of the newly acquired data, the rotation transformation R and the translation transformation t for minimizing an error according to Equation 1 are acquired as follows (S400). That is, the rotation transformation and the translational transformation for minimizing the error is acquired by minimizing an inner product between the eigenvector weighted with the eigenvalue of the voxel to which the three-dimensional corresponding point belongs and a vector generated from the three-dimensional corresponding point.

Meanwhile, it is assumed that there are a plane, a straight line, and a cylindrical figure in order to explain Equation 2.

$$E_i = \begin{bmatrix} e_i^1 \\ e_i^2 \\ e_i^3 \end{bmatrix}, \; \min_{Rt} \sum_i |E_i^T E_i| \quad \text{Equation 2}$$

A corresponding point of the three-dimensional map data closest in Euclidean distance to the newly acquired point using the three-dimensional lidar is found. At this time, a vector P made by two three-dimensional points $p_i$ and $q_k$ are calculated by using a component value of the eigenvector. That is, an error of each eigenvector direct is calculated. When the acquired eigenvalues are referred to as λ1, λ2, and λ3, a relationship between the eigenvalues is as follows.

λ1≤λ2≤λ3

The eigenvectors corresponding to the respective eigenvalues are v1, v2, and v3.

At this time, for example, if differences between the rotation transformation and translation transformation which are updated by applying the Levenberg-Marquardt algorithm and the rotation transformation and translation transformation which are calculated immediately before are less than a predetermined threshold, an error is determined to be minimum, the algorithm ends, and the processing proceeds to the next step (S500).

Next, the three-dimensional map data is updated based on the rotation transformation and the translation transformation calculated above (S500). At this time, if the three-dimensional point transformed based on the rotation transformation and the translation transformation is a new region, new eigenvalue and eigenvector are acquired. If the three-dimensional point belongs to the voxel in the same space as the three-dimensional corresponding point, the eigenvalue and eigenvector of the voxel may be updated.

FIG. 3 is a diagram illustrating a change in an expected value when a voxel to which an objective function is applied is in a plane, according to the embodiment of the present invention.

Referring to FIG. 3, a magnitude of a component of a vector $v_1$ of the vector P is made to be largest in a case of a plane, and contributiveness of the remaining two direction vector components is reduced. A graph of FIG. 3 illustrates how the error changes with the eigenvectors. An x axis represents a magnitude of the vector P in the graph. As a distance increases, an error of the component of the vector $v_1$ greatly increases, but magnitudes of the vector components in the directions $v_2$ and $v_3$ are hardly affected by a distance value. By doing so, a newly scanned point $p_i$ is disposed so as to exist on the same plane as the corresponding point $q_k$ with the closest Euclidean distance on the plane. That is, the one point $p_i$ has a small change in an error sum anywhere on the plane.

FIG. 4 is a diagram illustrating a change in an expected value when the voxels to which the objective function is applied are arranged in a straight line, according to the embodiment of the present invention.

If only a point cloud for a straight line exists in any one voxel and an eigenvalue thereof is acquired, two eigenvalues may be small and the other eigenvalue may be relatively large. Therefore, an eigenvector direction error value of each of the two vectors may have a shape illustrated in the graph of FIG. 4, and as newly scanned data has to exist near a region above a straight line within the voxel in a space, the error value may be maintained as the smallest value.

FIG. 5 is a diagram illustrating a change in an expected value when voxels to which an objective function is applied are arranged in a cylinder, according to the embodiment of the present invention.

If the eigenvalues for any one voxel are similar, a cylinder may be assumed. In this case, each eigenvector direction error may be affected by all direction components to some extent as in the plane of FIG. 3 and the straight line of FIG. 4. Basically, however, since the Euclidean distances are matched with the smallest component, the newly scanned data will converge to a certain point on a surface of the cylinder. This point has the smallest sum of errors near a point where the cylinder intersects a point on a plane where two eigenvalues form a plane rather than a height direction of the cylinder with the largest eigenvalue.

Figure 6:
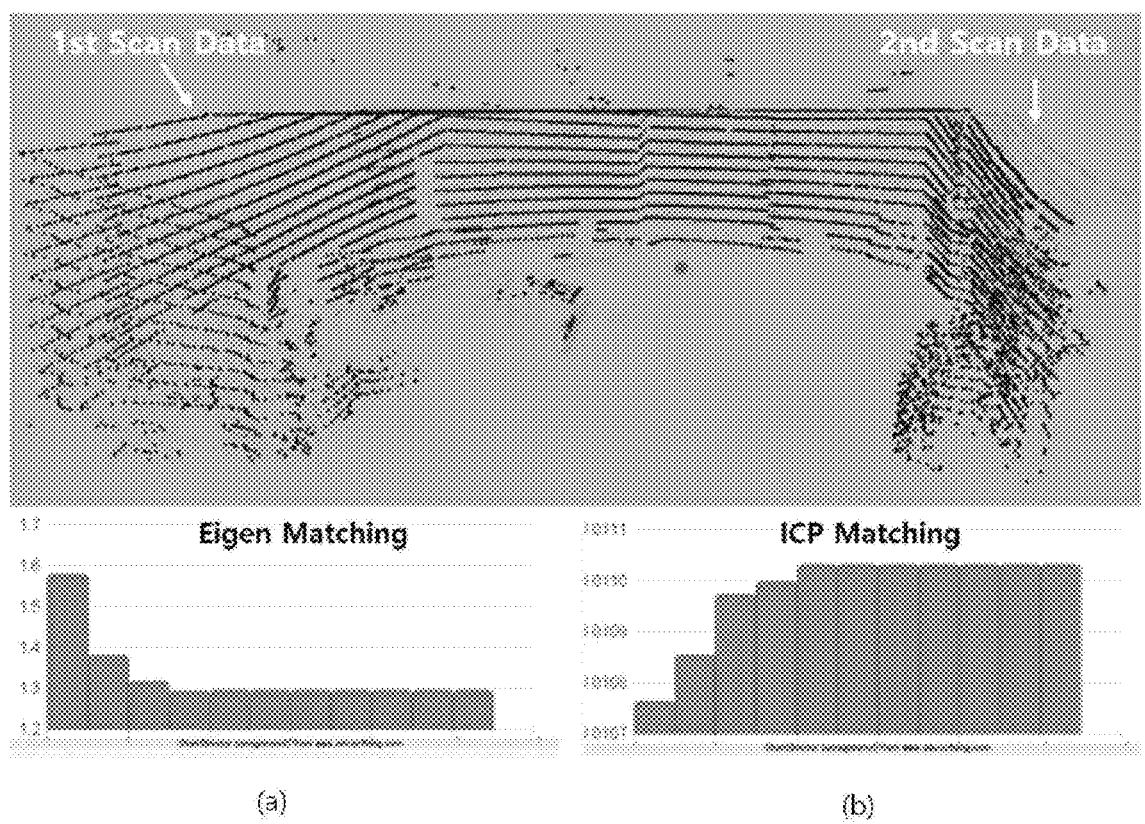
FIG. 6 is a view illustrating a comparison of a change in a value to which the objective function of the embodiment of the present invention is applied and a change in a value to which an ICP objective function of related art is applied.

FIG. 6 is a view illustrating a comparison of a change in a value to which an objective function of the embodiment of the present invention is applied and a change in a value to which the ICP objective function of the related art is applied.

FIG. 6 illustrates test results acquired by applying the objective function of the present invention and the ICP objective function for matching by using two consecutively acquired three-dimensional lidar data.

In the test, the exact rotation transformation and the translation transformation are made by using a value confirmed by a human eye while changing the values little by little as a true value, a graph of (a) of FIG. 6 illustrates a changed value of the objective function of the present invention, and a graph of (b) of FIG. 6 illustrates a changed value of the objective function of an iterative closest points (ICP) algorithm. In the graphs of FIG. 6, a horizontal x-axis represents the number of iterations. Referring to the graphs of FIG. 6, the closer the true value confirmed by the eye, the larger the value of the objective function of the ICP, while the value of the objective function of the present invention decreases rapidly. Accordingly, it is possible to confirm that the values are constantly converging.

A main reason for this tendency of the results of ICP is that in the three-dimensional map data with a low density, the Euclidean distance between two different data is reduced for an empty space.

FIG. 7 is a view illustrating disadvantages of the ICP objective function of the related art, and illustrates the case described above.

In FIG. 7, data represented in red is first acquired data, and data represented in black is second acquired data. Meanwhile, (b) of FIG. 7 is an enlarged view of a solid line rectangular portion 700 in (a) of FIG. 7. It can be seen that transformation in a direction of arrows occurs to reduce the Euclidean distance between the first and second acquired data, and that an error in a direction of yellow arrows increases as the number of iterations of the ICP increases.

Figure 8:
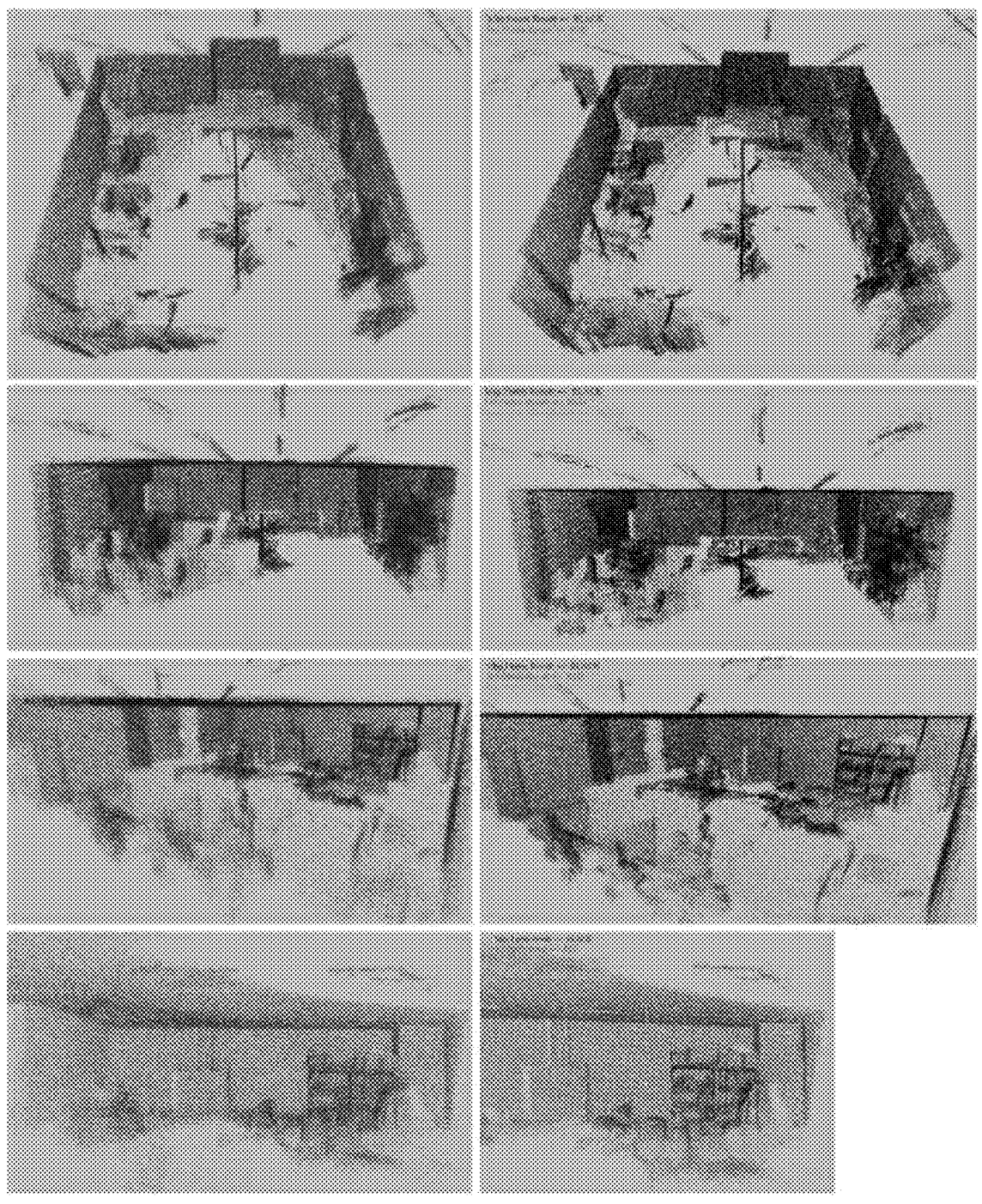
FIG. 8 is a view illustrating results of creating the three-dimensional map in an internal space using a three-dimensional lidar by comparing an ICP algorithm with the objective function of the present invention.

FIG. 8 is a view illustrating results of creating the three-dimensional map in an internal space using the three-dimensional lidar by comparing the ICP algorithm ((a) of FIG. 8) with the objective function ((b) of FIG. 8) of the present invention.

Referring to FIG. 8, it can be seen that the three-dimensional mapping result ((b) of FIG. 8) acquired by the objective function of the present invention is more accurate than the result ((a) of FIG. 8) acquired by the ICP.

Figure 9:
FIG. 9 is an image illustrating a result of creating a three-dimensional map in an outdoor environment by using the objective function of the present invention.

FIG. 9 shows test images illustrating results of creating the three-dimensional map in an outdoor environment using the objective function of the present invention, (a) of FIG. 9 is a result image viewed from above, and (b) of FIG. 9 is a result image viewed from the side. This is results of acquiring three-dimensional data for a wider space by carrying the VLP-16 lidar in hand and rotating the lidar up and down.

Hereinafter, an algorithm for creating the three-dimensional map according to the embodiment of the present invention will be described in more detail.

As described above, a plurality of voxels $V_a$, $V_b$, and $V_c$ are used to perform an algorithm for creating the three-dimensional map according to the embodiment of the present invention. A subscript in the voxel V represents a size of the voxel and has a relation of a>b>c. The centers $c_x$, $c_y$, and $c_z$ of the voxels represent average values of all three-dimensional points included in the voxels.

Further, upper voxels $V_a$ and $V_b$ are made by using the center of the voxel $V_0$. The top voxel $V_a$ is made for real-time performance. This is because when the three-dimensional map is created, the number of data stored in a computer memory increases considerably according to a travel distance, and thus, the real-time performance may not be guaranteed. Therefore, the data required to perform the current algorithm is selected through the voxel $V_b$ extracted from the upper voxel $V_a$. The three-dimensional map data $M_{t-1}$ includes all three-dimensional data generated up to the previous time t−1 and $V_b$ is generated from a subset $m_{t-1} \subset M_{t-1}$. Elements included in the voxel $V_b$ are a center, an eigenvalue, and an eigenvector of the voxel, and represented as follows.

$$V_b = [c_x, c_y, c_z, \lambda_1, \lambda_2, \lambda_3, v_1^T, v_2^T, v_3^T]^T$$

An element q of a voxel map $m_{t-1}$ is a 3×1 vector $q \in m_{t-1}$ having the center of the voxel $\bar{q}$ the voxel as an element in $\bar{q} \in \overline{m}_{t-1}$, and $p \in Z_t$ is a vector having the center as an element from $\bar{p} \in \overline{Z}_t$ in a set of voxels made of raw data acquired from a sensor in time. A map is a set $\overline{Z}_t$ of $V_c$ acquired by making raw data acquired from a sensor in time t into the voxel. A map $\overline{m}_{t-1}$ is a set including all the elements of the voxel which are a center value, an eigenvalue, and an eigenvector, in time t−1, and $m_{t-1}$ is a set of the 3×1 vectors having only the center value among these.

Next, in order to acquire a correspondence relation between the two sets $m_{t-1}$ and $Z_t$, a method of finding a correspondence relation in the ICP may be used. In order to find a more accurate correspondence relation, element centers, eigenvalues, and eigenvectors of two sets are all compared to each other, but in order to ensure the real-time performance, only the centers are compared to each other, and it is possible to assume that the two three-dimensional points $P_i$ and $q_k$ with the smallest Euclidean distance therebetween correspond to each other. At this time, above Equation 1 is calculated by using the eigenvalue and eigenvector in a voxel having the two three-dimensional points $P_i$ and $q_k$. KD-Tree may be used to find the fastest correspondence relation.

Now, the rotation transformation and the translation transformation that has to be calculated to build the three-dimensional map may be applied to the set $Z_t$ to finally acquire the updated maps $m_t$ and $M_t$ from the three-dimensional map $m_{t-1}$. To this end, Equation 2 may be calculated for all data for which the correspondence relation is found. Since Equation 2 may not be calculated directly, the Levenberg-Marquardt algorithm may be applied among optimization methods.

FIG. 10 is a pseudo code representing an algorithm for creating the three-dimensional map according to the embodiment of the present invention.

Referring to FIG. 10, a subset $\overline{m}_{t-1}$ of the three-dimensional map $\overline{M}_{t-1}$ created until now, a rigid body transformation $T_{t-1}$, and a set $Z_t$ of the three-dimensional points that store the center of the voxel $V_c$ from data newly acquired from the three-dimensional lidar sensor are given as input data. At this time, since the three-dimensional map $\overline{m}_{t-1}$ is given, the center, the eigenvalue, and the eigenvector for each voxel are already calculated. Results of the algorithm are a rigid body transformation $T_t$ at the current time and a newly updated three-dimensional map $\overline{m}_t$ of all elements of the voxel. There are two conditions for ending the algorithm. One is a case where a convergence condition is satisfied, and the other is a case where the number of given iterations are all performed. It is assumed that the convergence condition of the algorithm is satisfied if a difference between the rigid body transformation $T_{t-1}$ updated from Levenberg-Marqudart and the rigid body transformation previously calculated is less than a set threshold.

Hereinafter, a three-dimensional map building device according to another embodiment of the present invention will be described.

FIG. 11 is a block diagram illustrating each configuration of the three-dimensional map building device according to another embodiment of the present invention.

Referring to FIG. 11, the three-dimensional map building device 100 according to another embodiment of the present invention operates to generate three-dimensional map data 20 based on three-dimensional data scanned by a three-dimensional lidar 10, and is configured to include a voxel representation unit 110, an eigenvalue and eigenvector acquisition unit 120, a corresponding point detection unit 130, a transformation calculation unit 140, and a map updating unit 150.

Further, each configuration of the three-dimensional map building device 100 according to another embodiment of the present invention may be described with reference to FIG. 10 as follows.

The voxel representation unit 110 may represent the three-dimensional map data 20 for a surrounding environment acquired by using the three-dimensional lidar 10 as a voxel.

The eigenvalue and eigenvector acquisition unit 120 may calculate an eigenvalue λ and an eigenvector v of each voxel based on all three-dimensional points in each voxel.

The corresponding point detection unit 130 may detect three-dimensional corresponding points in the voxels corresponding to all the three-dimensional points of the three-dimensional data acquired by newly scanning by using the three-dimensional lidar 10 while the moving object travels. At this time, the Euclidean distance may be used for a corresponding point detection like the iterative closest points (ICP) algorithm.

The transformation calculation unit 140 may acquire rotation transformation and translation transformation for all the three-dimensional points of the newly acquired data according to Equation 1. That is, the rotation transformation and the translation transformation for minimizing an error are acquired by minimizing an inner product value between the eigenvector weighted with the eigenvalue of the voxel to which the three-dimensional corresponding point belongs and a vector generated from a three-dimensional corresponding point.

At this time, for example, if differences between the rotation transformation and translation transformation which are updated by applying the Levenberg-Marquardt algorithm and the rotation transformation and translation transformation which are calculated immediately before are less than a predetermined threshold, the error is determined to be minimum and thus, the algorithm may end.

The map updating unit 150 updates the three-dimensional map data based on the rotation transformation and the translation transformation calculated by the transformation calculation unit 140. At this time, if the three-dimensional point transformed based on the rotation transformation and the translation transformation is a new region, new eigenvalue and eigenvector are acquired, and if the three-dimensional point belongs to a voxel in the same space as the three-dimensional corresponding point, the eigenvalue and eigenvector of the voxel may be updated.

Although above description is made with reference to preferred embodiments of the present invention, it will be understood that those skilled in the art may variously modify and change the present invention without departing from the spirit and scope of the present invention described in claims below.

What is claimed is:

1. A real-time three-dimensional map building method using a three-dimensional lidar, comprising:
representing three-dimensional map data of a surrounding environment acquired by using a three-dimensional lidar attached to a moving object as voxels;
acquiring an eigenvalue and an eigenvector for each voxel based on all three-dimensional points in a three-dimensional map represented as the voxels;
detecting three-dimensional corresponding points in the voxels corresponding to all the three-dimensional points newly acquired by using the three-dimensional lidar while the moving object travels;
calculating a rotation transformation and a translation transformation for minimizing an error by minimizing an inner product value between the eigenvector weighted by the eigenvalue of the voxel to which the three-dimensional corresponding point belongs and a vector generated from a three-dimensional corresponding point; and
updating the three-dimensional map data based on the rotation transformation and the translation transformation,
wherein the rotation transformation and the translation transformation are acquired by an equation below, $$\left[\frac{1}{\lambda_1}v_1 \; \frac{1}{\lambda_2}v_2 \; \frac{1}{\lambda_3}v_3\right]^T [(Rp_i + t) - q_k] = \lceil e_i^1 e_i^2 e_i^3 \rceil^T$$

$$\lambda 1 > \lambda 2 > \lambda 3$$

in the above equation, λ is the eigenvalue, v is the eigenvector, R is the rotation transformation, t is the translation transformation, $e_i$ is an error in each eigenvector direction, $P_i$ is the three-dimensional point in the newly acquired three-dimensional data, $q_k$ is the three-dimensional corresponding point in the voxel, and T is transpose of a matrix.

2. The real-time three-dimensional map building method of claim 1, wherein the updating of the three-dimensional map data includes acquiring new eigenvalue and eigenvector if the three-dimensional point transformed based on the rotation transformation and the translation transformation is a new region, and updating the eigenvalue and eigenvector of the voxel if the three-dimensional point belongs to the voxel in the same space as the three-dimensional corresponding point.

3. The real-time three-dimensional map building method of claim 1, wherein the calculating of the rotation transformation and the translation transformation includes determining that the error is minimum if differences between the rotation transformation and translation transformation which are updated and the rotation transformation and translation transformation which are calculated immediately before are less than a predetermined threshold.

4. A real-time three-dimensional map building device using a three-dimensional lidar, comprising:
a voxel representation unit that represents three-dimensional map data of a surrounding environment acquired by using a three-dimensional lidar attached to a moving object as voxels;
an eigenvalue and eigenvector acquisition unit that acquires an eigenvalue and an eigenvector for each voxel based on all three-dimensional points in a three-dimensional map represented as the voxels;

a corresponding point detection unit that detects a three-dimensional corresponding point in the voxel corresponding to all the three-dimensional points of three-dimensional data newly acquired by using the three-dimensional lidar while the moving object travels;

a transformation calculation unit that calculates a rotation transformation and a translation transformation for minimizing an error by minimizing an inner product value between the eigenvector weighted by the eigenvalue of the voxel to which the three-dimensional corresponding point belongs and a vector generated from a three-dimensional corresponding point; and a map updating unit that updates the three-dimensional map data based on the rotation transformation and the translation transformation, wherein the rotation transformation and the translation transformation are acquired by an equation below, $$\left[\frac{1}{\lambda_1}v_1 \ \frac{1}{\lambda_2}v_2 \ \frac{1}{\lambda_3}v_3\right]^T [(Rp_i + t) - q_k] = \lceil e_i^1 e_i^2 e_i^3 \rceil^T$$

$$\lambda_1 > \lambda_2 > \lambda_3$$

in the above equation, $\lambda$ is the eigenvalue, $v$ is the eigenvector, R is the rotation transformation, t is the translation transformation, $e_i$ is an error in each eigenvector direction, $P_i$ is the three-dimensional point in the newly acquired three-dimensional data, $q_k$ is the three-dimensional corresponding point in the voxel, and T is transpose of a matrix.

5. The real-time three-dimensional map building device of claim 4, wherein the map updating unit acquires new eigenvalue and eigenvector if the three-dimensional point transformed based on the rotation transformation and the translation transformation is a new region, and updates the eigenvalue and eigenvector of the voxel if the three-dimensional point belongs to the voxel in the same, space as the three-dimensional corresponding point.

6. The real-time three-dimensional map building device of claim 4, wherein the transformation calculation unit determines that the error is minimum if differences between the rotation transformation and translation transformation which are updated and the rotation transformation and translation transformation which are calculated immediately before are less than a predetermined threshold.

* * * * *